(No Model.)
J. C. WADDELL.
Broadcast Seed Sower.
No. 242,402. Patented May 31, 1881.
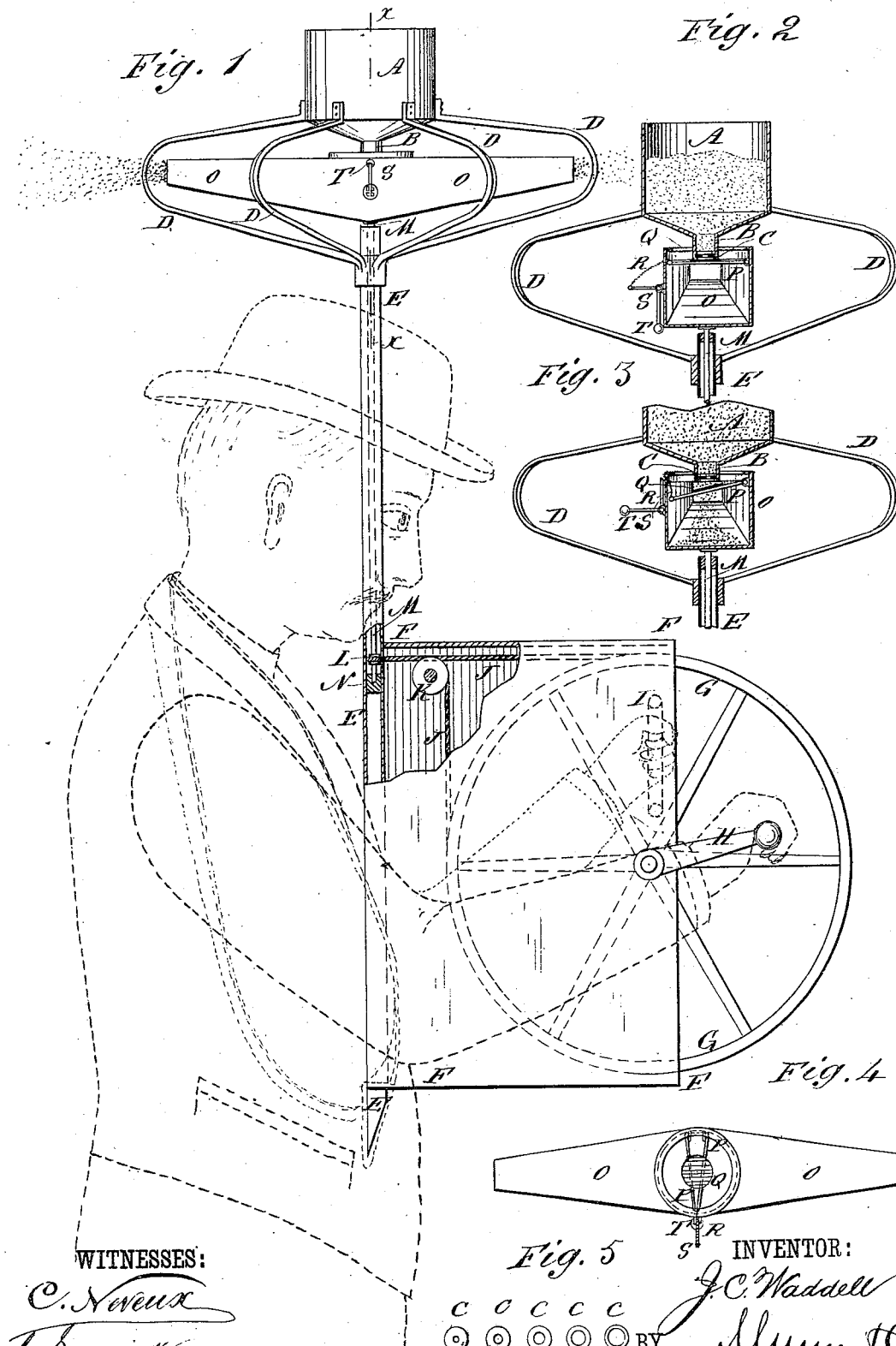
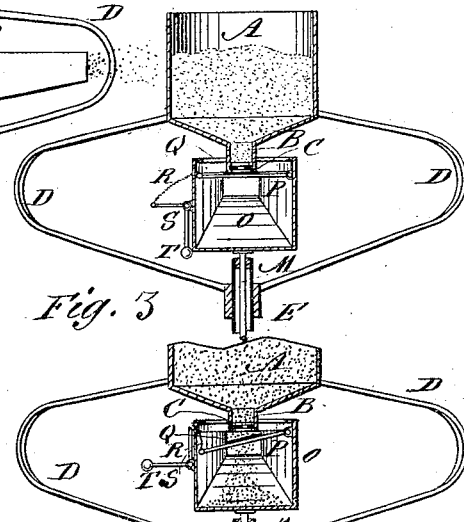
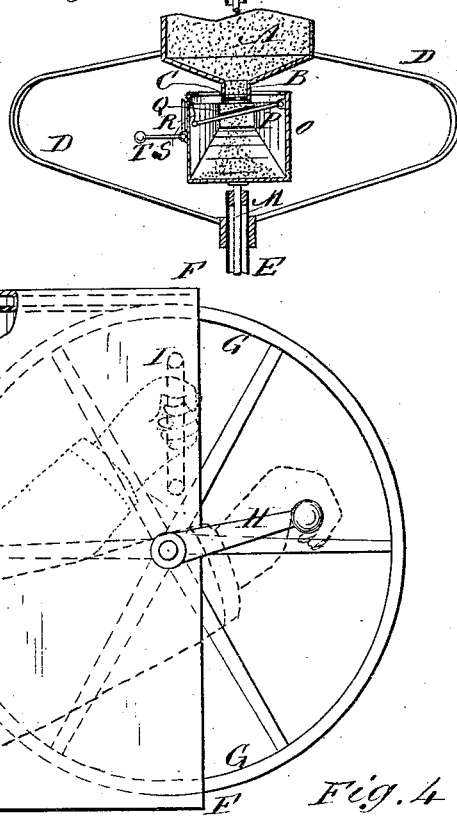
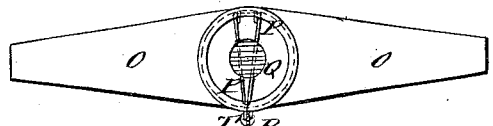
WITNESSES:
C. Neveux
C. Sedgwick
INVENTOR:
J. C. Waddell
BY Munn & Co
ATTORNEYS.

UNITED STATES PATENT OFFICE.

JOHN C. WADDELL, OF UNION CITY, TENNESSEE.

BROADCAST SEED-SOWER.

SPECIFICATION forming part of Letters Patent No. 242,402, dated May 31, 1881.

Application filed November 26, 1880. (No model.)

*To all whom it may concern:*

Be it known that I, JOHN C. WADDELL, of Union City, in the county of Obion and State of Tennessee, have invented a new and useful Improvement in Broadcast Seed-Sowers, of which the following is a specification.

Figure 1 is a side elevation of the improvement, partly in section. Fig. 2 is a sectional elevation of the upper part of the improvement, taken through the line $xx$, Fig. 1, showing the position of the parts when at rest. Fig. 3 is the same section as Fig. 2, but showing the position of the parts when in motion. Fig. 4 is a plan view of the rotary cross-spout. Fig. 5 represents a set of graduated separate bottoms.

The object of this invention is to furnish broadcast seed-sowers for sowing clover-seed and other fine seeds, so constructed as to sow the seed in uniform quantities; which will stop the escape of seed automatically when the mechanism comes to a state of rest, and which can be readily adjusted for sowing any desired quantity of seed per acre, and finer or coarser seeds, as may be desired.

A represents the seed-receiver, the bottom of which is concaved, and is provided with a short discharge-tube, B. The discharge-tube B is provided with a separate bottom, C, having a discharge-opening of such a size as will discharge a given quantity of the seed to be sown in a given time.

When more or less seed is to be sown to an acre, and when larger or smaller seeds are to be sown, the discharge-bottom C is removed, and is replaced by another bottom, C, having a larger or smaller discharge-opening, as may be required.

The seed-receiver A is attached to the upper end of six (more or less) rods or bars, D, which are bent outward and inward into U form, and their lower ends are attached to the upper end of a tubular staff, E. The lower end of the tubular staff E is designed to be inserted in a socket formed in or attached to a strap passed over the shoulder of the person carrying the machine.

To the lower part of the hollow staff E is attached a narrow box, F, made of thin sheet metal or other suitable material. The box F is made with its outer edge open to receive the wheel G, which is also made of sheet metal or other light material. The journals of the wheel G revolve in bearings in the sides of the box F, near the outer edges of the said sides, and to one of the said journals is attached a crank, H, by means of which the machine is operated.

To the outer part of the other side of the box F is attached a handle, I, for convenience in holding the machine steady while being used.

The rim of the wheel G is grooved to receive a band, J, the lower part of which passes over a guide-pulley, K, pivoted to and between the upper inner parts of the sides of the box F to bring the two parts of the band J into the same horizontal position. The band J passes around a small grooved pulley, L, attached to the lower part of a shaft, M, the lower end of which revolves in a socket block or step, N, secured in the cavity of the hollow staff E a little below the upper edge of the box F. The shaft M passes up through the upper part of the cavity of the hollow staff E, and to its upper end, just above the upper end of the said hollow staff E and below the discharge-tube B of the seed-receiver A, is attached the center of the bottom of a cross-spout, O, which is made with close bottom, top, and sides, and with open ends. The cross-spout O is tapered toward its ends, and has an opening surrounded by an upwardly-projecting flange in the middle part of its top.

P is a wire, bent into the form of an acute isosceles triangle, and which is hinged at its short side or base to the cross-spout O at one side of the opening in its top. The triangle P is made of such a length that its apex will reach to, or nearly to, the other side of the cross-spout O, and to the middle part of the said triangle is attached a plate, Q, of sufficient size to cover the lower end of the discharge-tube B of the seed-receiver A, so that the discharge-opening of the said seed-receiver can be closed by raising the wire frame P to bring the plate Q against the lower end of the discharge-tube B, and can be opened by lowering the said wire frame.

To the apex of the wire frame P is attached the end of a small cord or chain, R, which passes through a guide-hole in the upper part of the side of the cross-spout O, or over a guide-pulley pivoted to the said side of the cross-spout O. The other end of the cord or chain R is attached to the end of one arm of the right-angled lever S, which is pivoted at its angle to the side of the spout O, and has a small weight, T, attached to the end of its other arm. The cord R is made of such a length that when the weighted arm of the lever S hangs vertical the triangular wire frame P will be raised, bringing the plate Q against the lower end of the discharge-tube B, and preventing the escape of seed. When the weighted arm of the lever S is raised into a horizontal position the triangular frame P and its plate Q will drop away from the discharge-tube B, and allow the seed to escape freely into the cross-spout O.

In using the sower it is carried and operated in the manner hereinbefore described, the shaft M being revolved very rapidly and carrying the cross-spout O with it in its revolution. As the cross-spout O revolves the centrifugal force thus engendered raises the weighted arm of the lever S into a horizontal position, allowing the frame P and plate Q to drop away from the discharge-tube B, so that the seed will flow into the cross-spout O and be discharged radially from the ends of the said spout O. As soon as the motion of the machine is stopped the weighted arm of the lever S drops into a vertical position, raising the frame P and plate Q, and preventing any further outflow of seed, so that the seed will escape from the seed-receiver A only while the sower is in operation.

Having thus described my invention, I claim as new, and desire to secure by Letters Patent—

In a seed-sower, the combination, with the revolving cross-spout O and the discharge-tube B of the seed-receiver A, of the hinged frame P, carrying plate Q, the cord R, and the right-angled lever S, having a weight, T, attached to its free arm, substantially as herein shown and described, whereby the seed-discharge opening is opened and closed by the starting and stopping of the driving mechanism, as set forth.

JOHN CALVIN WADDELL.

Witnesses:
   SEID WADDELL,
   DAVID LAWRANCE.